Nov. 7, 1933.　　　　K. H. HUBBARD　　　　1,934,124
RECORDING SPHYGMOMANOMETER
Filed April 11, 1931
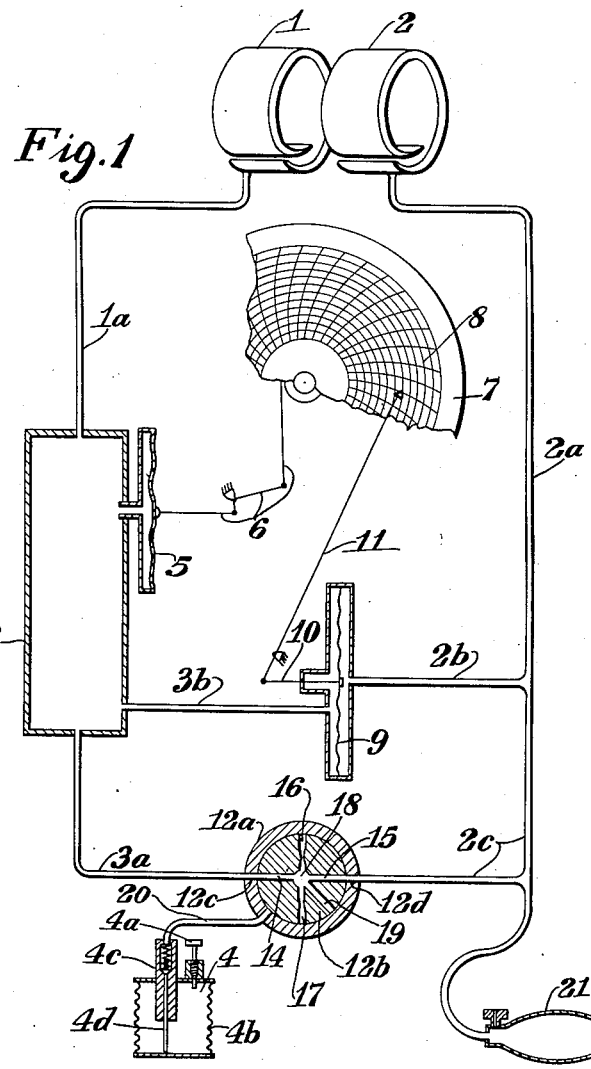
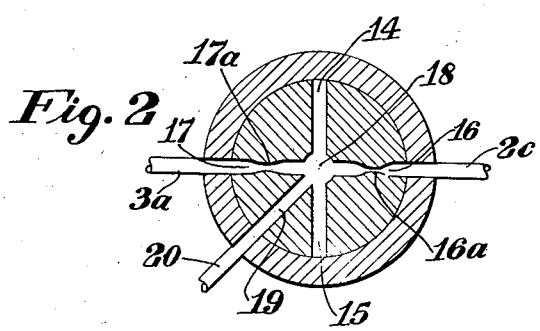
INVENTOR:
Karl H. Hubbard
BY
Alfred Burger
ATTORNEY Patented Nov. 7, 1933

1,934,124

UNITED STATES PATENT OFFICE 1,934,124

RECORDING SPHYGMOMANOMETER

Karl H. Hubbard, Rochester, N. Y., assignor to Taylor Instrument Companies, Rochester, N. Y., a corporation of New York Application April 11, 1931. Serial No. 529,380

6 Claims. (Cl. 234—5.7)

This invention relates more specifically to recording sphygmomanometers of the type described in the patent to Levin 1,532,705, granted on April 7, 1925, but is generally applicable to all forms of recording sphygmomanometers including a pressure system containing two branches of unequal volumes and an exhaust valve or another form of outlet for gradually reducing the pressure in the system, wherein it is desirable or necessary to maintain the pressures in both branches equal at all stages of the pressure reduction.

The object of the invention, the principle of operation on which it is based and the advantages will appear from the detailed description taken in connection with the accompanying drawing which forms a part of the specification.

In the drawing Fig. 1 is a diagrammatic representation of the essential parts of a recording sphygmomanometer embodying the invention, the principal part being shown in section; and Fig. 2 is an enlarged sectional view of the principal part in a different position.

In the drawing 1 and 2 represent two pressure chambers or rubber bags of the type usually applied to the upper arm. While the two bags are shown as separate elements, they are in practice united in the form of a double-chambered unit, as described in the patent to Stewart 1,729,297.

The chamber 1 is connected to a reservoir 3 and the latter is connected to a controllable exhaust or leak 4. A diaphragm 5 is in fluid connection with the reservoir and the movement of the diaphragm is translated by transmitting mechanism 6 to a recorder disk 7 carrying a recorder chart 8.

The chamber 2 is connected to one side of a diaphragm 9 and also to the leak 4, the opposite side of the diaphragm 9 being in fluid connection with the reservoir 3. The movement of the diaphragm 9 is translated by transmitting mechanism 10 to a pen 11 for inscribing a record upon the chart 8.

The mechanism for operating the disk 7 and the pen 11 and the adjustable leak are generally the same as disclosed in the patent to Ireland 1,729,291 granted September 24, 1929 and need not be shown in detail.

The whole arrangement described is a pressure system containing two separate branches. One branch includes the bag 1, conduit 1a, reservoir 3, capsular diaphragm 5, conduit 3a, conduit 3b, and one half of the capsular diaphragm 9. The second branch includes bag 2, conduit 2a, conduit 2b, the other half of capsular diaphragm 9 and conduit 2c.

The invention comprises a mechanism for proportioning the rate of withdrawal of air or other pressure fluid from the two branches of the pressure system so as to maintain equal pressures therein at all stages of deflation through the leak 4. Thus there will be equal and opposite pressures on the opposite sides of diaphragm 9.

To this end, I provide a rotary valve composed of the stationary member 12a and the rotary member 12b, wherein the former has two ports 12c and 12d connected with the conduits 3a and 2c, respectively, and the latter has two sets of passages 14, 15 and 16, 17, respectively, so disposed that by rotation of the inner member 12b one or the other of the sets of passages may be brought into alignment with the ports 12c and 12d.

A conduit 19 leads from the intersection 18 of the two sets of passages to the periphery of the rotary member 12b and a conduit 20 leads from the stationary member 12a to the exhaust 4. The arrangement is such that the conduit 19 registers with the conduit 20 when the passages 16 and 17 are in a position to interconnect the conduits 3a and 2c, as indicated in Fig. 2.

A pump or hand bulb 21 is connected to the pressure system, preferably near the valve 12a 12b and in the particular arrangement disclosed it is connected to the conduit 2c.

The operation of the apparatus is generally the same as that described in the above mentioned patents:

First, after the pneumatic bags 1 and 2 have been applied to the arm, the bulb 21 is used to pump air into the system until the pressure, which is indicated by the position of the chart 8, has reached a value above the assumed or expected systolic pressure. For this part of the operation the rotary valve member 12b is so placed as to interconnect the conduits 3a and 2c by the passages 14 and 15, whereby the air can freely flow into the two branches of the pressure system. Then the valve member is rotated to the position indicated in Fig. 2, whereby the air in the system can escape from both branches through the two orifices 16a and 17a and the conduit 20 to the exhaust 4.

The orifices 16a and 17a are so designed that the rate of flow from the two branches is proportional to their respective volumes, with the result that the pressure in the two branches is equal at all stages of the exhausting operation. In other words, the amount of air flowing per unit of time through the orifice 17a from the branch containing the reservoir 3, having the larger volume, is larger than the amount flowing through the orifice 16a, in the same proportion as the volume of the first branch is larger than the volume of the second branch.

The rate at which the system is exhausted is regulated by the valve 4a of the exhaust 4. The pressure regulator, including the expansible diaphragm 4b, valve 4c and spring-pressed valve stem 4d, all of which parts form a part of the exhaust, regulates the flow of the air out of the valve 4a.

The orifices need not be of definite sizes, so long as their proportionality factor remains the same, but may vary within certain limits, having due regard to the fact that the orifice 16a has the primary function of retarding the diffusion and dissipation of the wave superimposed upon the body of air in cuff 2 by the pulse, so as to obtain a large reaction of this wave upon diaphragm 9. Similarly to the oscillometer in the patents above referred to, the diaphragm 9 is exposed on both sides to the pressure of the air put into the system by the pump 21 so that only pressure variations set up in cuff 2 by the pulse can be registered by diaphragm 9.

The form of the mechanism represented by the rotary valve may be modified within wide limits.

I claim:

1. In apparatus for recording conditions of the vascular system, the combination of two chambers having a diaphragm as a common wall, a pressure system having two branches of unequal volumes, said branches respectively communicating with said chambers, means for supplying a pressure fluid to the system, and means for withdrawing pressure fluid therefrom, including means unresponsive to pressure fluid for proportioning the rate of withdrawal from one branch relatively to the rate of withdrawal from the other branch, whereby equal pressures are maintained at the opposite sides of said diaphragm.

2. In apparatus for recording conditions of the vascular system, the combination of two chambers having a diaphragm as a common wall, a pressure system having two branches of unequal volumes respectively communicating with said chambers, and means for supplying a pressure fluid to the system, said two branches having a connection for intercommunication, and means in said connection for withdrawing pressure fluid from the two branches, including means unresponsive to the difference in pressures in said branches for proportioning the rate of withdrawal from one branch relatively to the withdrawal from the other branch, whereby equal pressures are maintained at opposite sides of said diaphragm.

3. In apparatus for recording conditions of the vascular system, the combination of a pressure system having two branches of unequal volumes, means for supplying a pressure fluid to the system, said two branches having a connection for intercommunication, and means in said connection for withdrawing pressure fluid from the two branches, said last-mentioned means including an outlet and an orifice on each side of the outlet in the connection, said orifices being dimensioned to proportion the rate of withdrawal from one branch relatively to the rate of withdrawal from the other branch.

4. In apparatus for recording conditions in the vascular system, the combination of a pressure system having two branches of unequal volumes, a conduit for intercommunication between the two branches, and means in said conduit including a rotatable member providing in one position an unrestricted passage way in said conduit and providing in another position orifices of unequal sizes in the conduit and an outlet between the orifices.

5. In apparatus for recording conditions in the vascular system, a pressure system having two branches, one of said branches including an elastic pressure chamber, a reservoir connected therewith and a pressure-responsive member in communication with the reservoir, and the second branch including a second elastic pressure chamber and a pressure-sensitive diaphragm in fluid connection on one side with the first branch and in fluid connection on the other side with the second pressure chamber, a conduit for interconnecting the two branches, including an outlet and orifices of unequal sizes in the said conduit on opposite sides of the outlet.

6. In apparatus of the character described, a valve comprising a tubular member and a cylindrical member for rotative movement therein, the tubular member having two openings and an outlet the cylindrical member having two sets of passages disposed to interconnect said openings in either one of two different rotative positions of the cylindrical member and one set of passages defining two orifices of different size and a fluid connection from a point in said last mentioned passage to the atmosphere through the outlet.

KARL H. HUBBARD.